United States Patent
Wong

(10) Patent No.: US 11,072,472 B2
(45) Date of Patent: Jul. 27, 2021

(54) LID HAVING A COMPARTMENT AND CONTAINER COMPRISING THE SAME

(71) Applicant: KING'S FLAIR MARKETING LIMITED, Tortola (VG)

(72) Inventor: Siu Wah Wong, Hong Kong (HK)

(73) Assignee: KING'S FLAIR MARKETING LIMITED, Tortola (VG)

( * ) Notice: Subject to any disclaimer, the term of this patent is extended or adjusted under 35 U.S.C. 154(b) by 97 days.

(21) Appl. No.: 15/889,575

(22) Filed: Feb. 6, 2018

(65) Prior Publication Data

US 2018/0222646 A1 Aug. 9, 2018

Related U.S. Application Data

(60) Provisional application No. 62/455,847, filed on Feb. 7, 2017.

(51) Int. Cl.
| | | |
|---|---|---|
| *B65D 51/28* | (2006.01) | |
| *B65D 81/32* | (2006.01) | |
| *B65D 81/38* | (2006.01) | |
| *B65D 77/24* | (2006.01) | |
| *A47J 47/00* | (2006.01) | |
| *B65D 43/16* | (2006.01) | |

(52) U.S. Cl.
CPC ..... *B65D 51/2878* (2013.01); *B65D 81/3222* (2013.01); *B65D 81/3869* (2013.01); *A47J 47/00* (2013.01); *B65D 43/163* (2013.01); *B65D 77/245* (2013.01); *B65D 2543/0037* (2013.01); *B65D 2543/00351* (2013.01)

(58) Field of Classification Search
CPC ............ B65D 51/2807; B65D 51/2878; B65D 51/2892; B65D 51/2857; B65D 51/2864; B65D 81/3222; B65D 51/28; B65D 2543/0037; B65D 77/245
USPC .................................................. 206/221, 219
See application file for complete search history.

(56) References Cited

U.S. PATENT DOCUMENTS

| | | | | |
|---|---|---|---|---|
| 5,373,937 A | * | 12/1994 | Lamboy ............... | B65D 25/087 206/221 |
| 5,375,937 A | * | 12/1994 | Oh .......................... | B42F 13/40 402/73 |
| 5,417,321 A | * | 5/1995 | Halm ..................... | B65D 25/08 206/221 |
| 6,257,428 B1 | * | 7/2001 | Caola .................... | A61J 1/2093 206/219 |
| 6,302,268 B1 | * | 10/2001 | Michaeli ............ | B65D 51/2878 206/221 |
| 7,658,298 B2 | * | 2/2010 | Merey ................ | B65D 81/3222 220/522 |
| 8,328,010 B2 | * | 12/2012 | Lee .................... | B65D 51/2864 206/221 |

(Continued)

*Primary Examiner* — Steven A. Reynolds
(74) *Attorney, Agent, or Firm* — Nyemaster Goode P.C.

(57) ABSTRACT

The Applicant's invention provides a lid for a food container including a cover, a dressing storage compartment, and a shutter attached to the cover or the dressing storage compartment for sealingly closing the dressing storage compartment. The shutter is configured to allow dispensing of the dressing contained in the dressing storage compartment when the dressing storage compartment is caused to move up relative to the cover, without the need of opening the lid. The Applicant's invention also provides a food container including the lid.

20 Claims, 6 Drawing Sheets

(56) References Cited

U.S. PATENT DOCUMENTS

| | | | |
|---|---|---|---|
| 2006/0185990 A1* | 8/2006 | Rybar | B65D 81/3211 206/219 |
| 2007/0235457 A1* | 10/2007 | Merey | B65D 81/3222 220/522 |
| 2009/0188929 A1* | 7/2009 | Sims | A47G 19/2205 220/710 |
| 2014/0001207 A1* | 1/2014 | Dyrbye | B65D 51/2828 222/129 |
| 2014/0102919 A1* | 4/2014 | Gutierrez | A61J 9/008 206/221 |

* cited by examiner

LID HAVING A COMPARTMENT AND CONTAINER COMPRISING THE SAME

TECHNICAL FIELD OF THE INVENTION

This invention relates generally to a lid for a food container, and in particular, to a lid having a dressing storage compartment and a food container comprising such a lid.

BACKGROUND OF THE INVENTION

Various portable food and condiment kits are currently available for on-the-go use. In conventional kits for this purpose, the food stuffs such as salads or other food products are stored in a container and packaged together with a separate packet or sachet of salad dressing or other condiments. A user opens the salad dressing packet or sachet to dispense the salad dressing into the salad container. This arrangement is cumbersome and might be messy if the dressing is not handled carefully. Also disposal of the dressing packaging is problematic, which is detrimental to the environment.

Attempts have been made to propose other portable food container and condiment kits, for example in U.S. Pat. No. 5,664,671, US 2006/0185990A1, and CN106429000.

U.S. Pat. No. 5,664,671 issued to Greydon Wesley Nedblake discloses a combination container including an upper container adapted for holding a beverage or a soup, and a lower container adapted for holding an edible solid food e.g. sandwich or salad, wherein the upper and lower containers are oriented in a superposed relationship. The combination container further comprises coupling means detachably interconnecting the upper and lower containers. This type of combination container requires to dispense the beverage and the food separately from the two different containers.

US 2006/0185990A1 discloses a disposable salad container assembly including a container base, a cover removably mounted on the base, and a sealed salad dressing insert for nesting within the cover. The insert has a flexible top, a salad dressing reservoir, an opening, a breakable seal over the opening, and a puncturing mechanism capable of breaking the seal on application of sufficient pressure to the flexible top thereby allowing the contents of the reservoir to dispense into the base. To dispense the salad dressing into the container base, the puncturing mechanism is depressed to pierce the breakable seal to allow the salad dressing to flow into the container base. This type of salad container assembly is disposable with a single use.

CN106429000 discloses a salad container comprising a salad bowl and a sealing cap portion made of aluminum foil and heat-sealed on the salad bowl. The sealing cap portion has a compartment for holding a salad dressing, and a tearable part at the bottom of the salad dressing compartment. After the tearable part is torn off, the salad dressing flows onto the salad bowl.

The above patents or patent applications teach respective combination containers of different structures. Still, there is a need for the provision of a container for on-the-go use and capable of separately storing the salad and the salad dressing in a leakproof manner to prevent unwanted leaks and spills, which enables the two food stuffs to be mixed easily before being consumed.

SUMMARY OF THE INVENTION

The present invention has been developed to fulfill the needs noted above. Therefore, the present invention has a principle object of providing a container which provides an easy and convenient way to transport a user's favorite dressing on-the-go.

A further object of the invention is to provide a container which has a simple way of releasing a salad dressing into the salad without the need of human intervention to avoid the mess of dispensing the dressing.

Yet another object of the invention is to provide a container which is light to carry, easy to dispense the salad dressing, and a cinch to clean.

A first aspect of the present invention is to provide a lid for a food container, comprising:

a cover having a window formed therethrough, a dressing storage compartment received in the window of the cover for holding a first foodstuff and having an open bottom, and a shutter attached to the cover or the dressing storage compartment for sealingly closing the open bottom of the dressing storage compartment, wherein the shutter is configured to allow dispensing of the first foodstuff contained in the dressing storage compartment through the open bottom when the dressing storage compartment is caused to move up relative to the cover.

In an embodiment of the present invention, the dressing storage compartment may be movable between a ready-to-use position wherein the shutter engages with the dressing storage compartment in a manner that the open bottom of the dressing storage compartment is sealingly closed by the shutter, and a pulled-up position wherein the shutter disengages from the open bottom of the dressing storage compartment to allow the dispensing of the first foodstuff. Preferably, the dressing storage compartment may be flush with the cover in the ready-to-use position, and the dressing storage compartment may be forced to move up to the pulled-up position where at least part of the dressing storage compartment protrudes beyond the cover so as to disengage the shutter from the open bottom of the dressing storage compartment.

In one specific embodiment of the invention, the dressing storage compartment may comprise an upper wall, a side wall extending downwardly from an edge of the upper wall, and a flange extending outwardly from a lower section of the side wall and connected to the cover, wherein the flange is depressed and forms together with the side wall a depressed portion in the ready-to-use position. In some cases, the shutter may be pivotally attached to the cover or the dressing storage compartment, and is caused to automatically disengage from the open bottom of the dressing storage compartment after the dressing storage compartment is moved up and/or subject to a squeeze action. The shutter may comprise two tabs in a spaced-apart fashion, and the two tabs are positioned to be releasably attached to an inner surface of the lower section of the side wall. Preferably each of the tabs may comprise a lateral coupling which is releasably snap-fitted into a groove formed in the lower section of the side wall.

In one embodiment of the invention, the cover may be pivotally coupled to a side wall of a top of a container portion of the food container. The cover may also comprise a lid latch which releasably engages with a corresponding container latch formed on the side wall of the top of the container portion.

In another specific embodiment of the invention, the shutter may be secured to the cover and formed with a plurality of through holes extending therethough, and the shutter may further comprise a central protrusion which is sized and shaped to releasably and sealingly engage with the open bottom of the dressing storage compartment. In some cases, the upward movement of the dressing storage compartment may drive disengagement of the central protrusion from the open bottom of the dressing storage compartment, with a gap created between the shutter and the dressing storage compartment to allow the dispensing of the first foodstuff through the open bottom, the gap and the plurality of through holes.

In some cases the cover may comprise a lower cover portion threaded to a side wall of a top of a container portion, and a top cover portion pivotally coupled to the lower cover portion. The lower cover portion and the top cover portion may be configured to have respective coaxial windows for passage of the dressing storage compartment therethrough. The top cover portion may comprise a top latch which releasably engages with a corresponding lower latch formed on the lower cover portion.

Preferably, a first sealing ring may be arranged between the lower cover portion and the top of the container portion so that they are sealingly coupled with each other.

In some cases, a neck may extend downwardly from the top cover portion and threaded into the lower cover portion. Preferably a second sealing ring may be arranged between the neck and the lower cover portion so that they are sealingly coupled with each other.

According to the invention, the dressing storage compartment may be made of an elastic and deformable material, and the shutter may be made of a non-elastic material. As an alternative, the dressing storage compartment may be made of a non-elastic material, and the dressing storage compartment may further comprise a mechanical sliding device which is configured to slide the non-elastic dressing storage compartment upwards and downwards. The sliding device may be similar in structure to a coffee cup having a slidable inner cup.

A second aspect of the present invention provides a food container comprising a lid according to the invention, and a container portion having an open top over which the lid is placed and configured to hold a second foodstuff.

The food container may be provided a salad container having a dressing contained in the dressing storage compartment, and the salad contained in the container portion.

In some cases, a holder may be provided on an outer wall of the container portion for holding food serving utensils, for example salad tossers.

To have a better understanding of the invention reference is made to the following detailed description of the invention and embodiments thereof in conjunction with the accompanying drawings.

BRIEF DESCRIPTION OF THE DRAWINGS

In the various figures of the drawings, like reference numbers are used to designate like parts.

DETAILED DESCRIPTION OF THE INVENTION

While this invention is illustrated and described in preferred embodiments, the lid of the invention and the food container comprising the lid may be produced in many different configurations, sizes, forms and materials.

Figure 1:
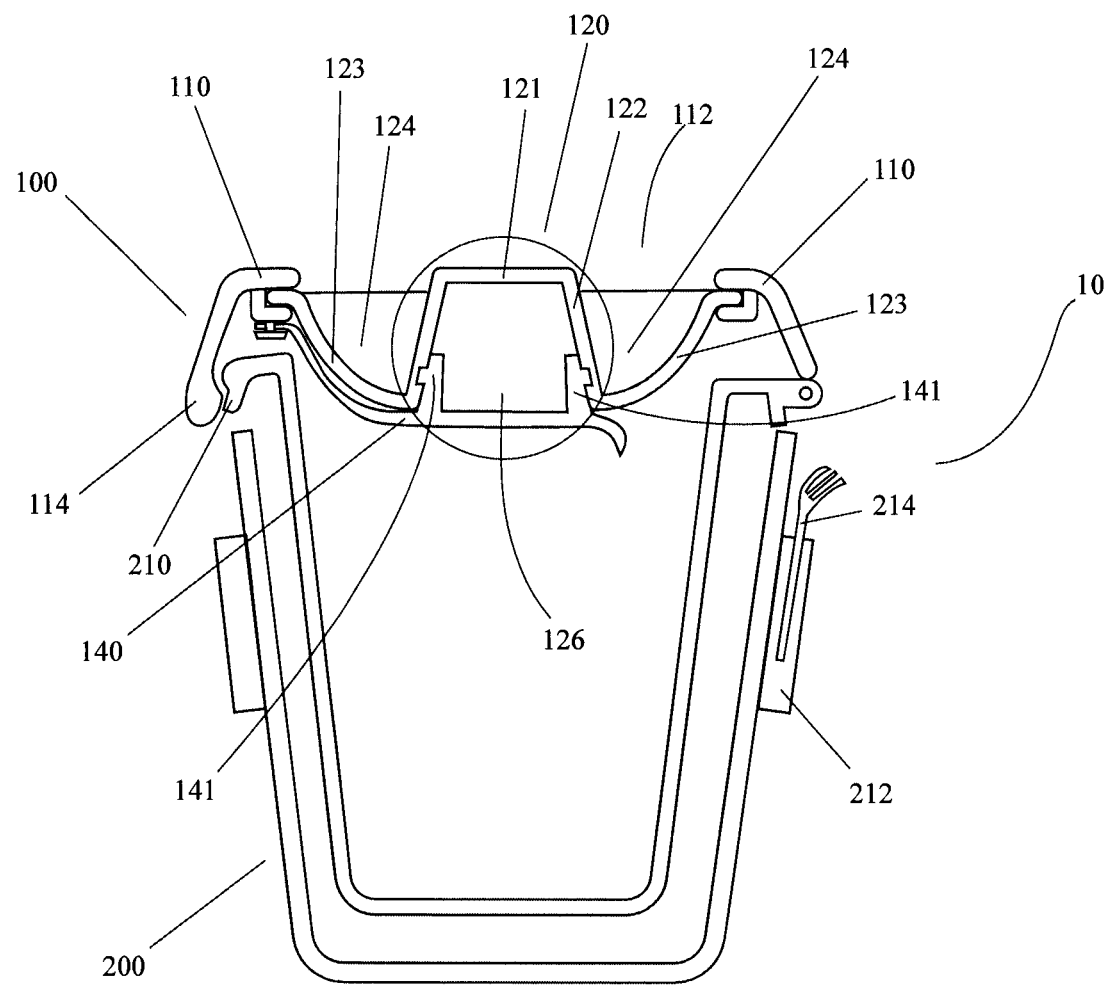
FIG. 1 is a cross-sectional view of a food container constructed according to a first embodiment of the present invention, with the dressing storage compartment in the ready-to-use position.
Figure 2:
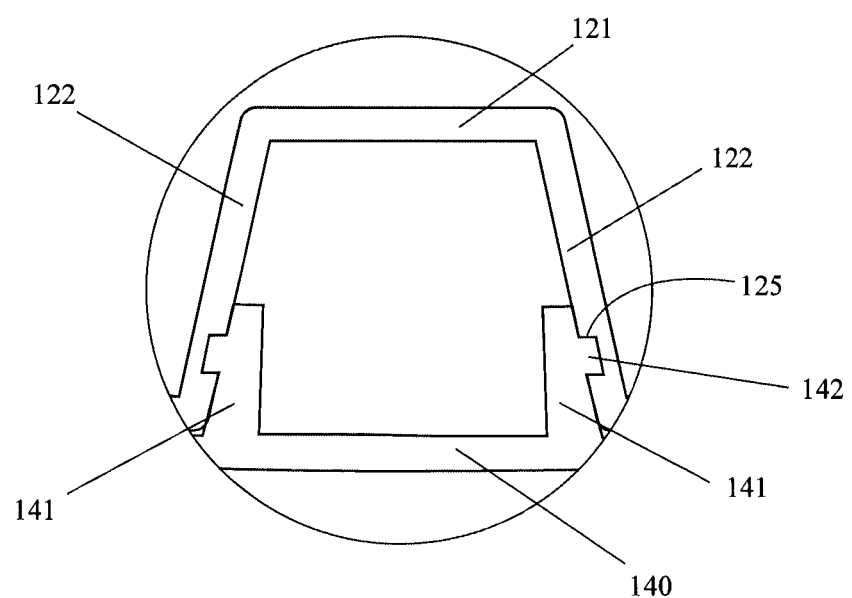
FIG. 2 is an enlarged cross-sectional view of the circled area of the lid of the food container shown in FIG. 1.
Figure 3:
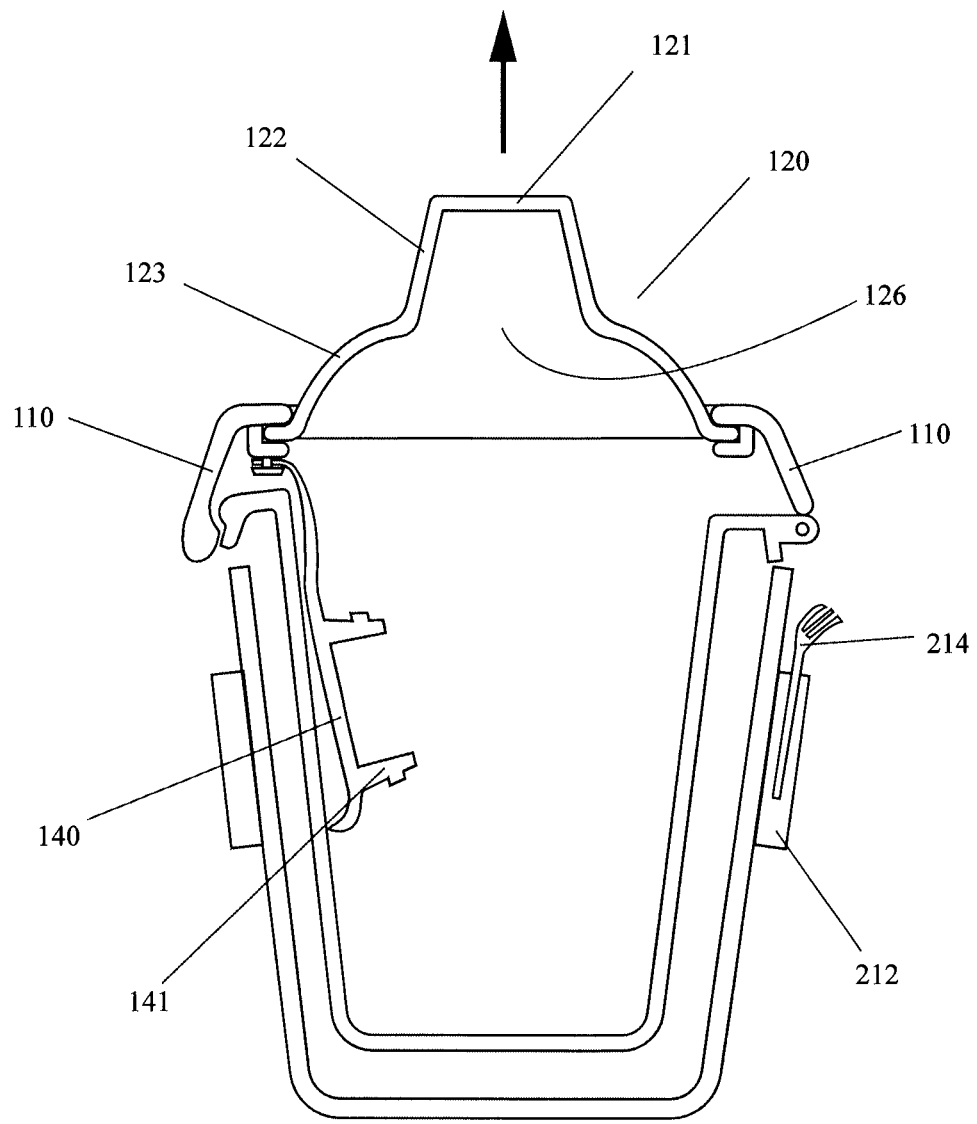
FIG. 3 is a cross-sectional view of the food container shown in FIG. 1, with the dressing storage compartment in the pulled-up position.

Referring now to the drawings, FIGS. 1 to 3 provide a food container constructed according to a first embodiment of the invention. As shown in FIG. 1, the container 10 comprises a lid 100, and a container portion 200 having an open top over which the lid 100 is placed. The lid 100 and the container portion 200 together can be referred to as the "container" 10. The lid 100 is pivotally coupled to the top of the container portion 200. It would be within the ability of a person skilled in the art that the lid can be clipped or screwed onto the container portion by push fit or threads in a standard manner.

The container portion 200 may be of a dual wall construction as shown in FIG. 1 or a single wall construction. The dual wall construction provides the thermal isolation to the contents in the container portion 200. In this case, there is no thermal isolating material between the two walls and simply air is used as the thermal isolating material.

A holder 212 may be provided on the outer wall of the container portion 200 for holding salad tossers or a fork 214 for the purpose of mixing or consuming the foodstuff contained in the container portion 200, such as salad.

The lid 100 comprises a cover 110 pivotally coupled to a side wall of the top of the container portion 200 and configured to have a central window 112. The lid 100 also includes a lid-latch 114 that releasably engages with a corresponding container-latch 210. In operation, the lid-latch 114 engages with the container-latch 210 to maintain the container in a closed position. When a force is applied to bias the lid-latch 114 away outwardly to disengage the container-latch 210, the lid 100 is allowed to be opened and the open top of the container portion 200 is exposed, and the user is able to access to and consume the salad contained in the container portion 200.

The lid 100 further comprises a dressing storage compartment 120 received in the window 112 of the cover 110, and a shutter 140 pivotally attached to the cover 110 at a position adjacent to the lid-latch 114. The dressing storage compartment 120 has an open bottom 126. The shutter 140 is configured to releasably close the open bottom 126 of the dressing storage compartment 120 which is filled with a salad dressing or other food stuff.

The dressing storage compartment 120 is typically made out of an elastic and deformable material such as silicon. In the embodiment shown in FIGS. 1-3, the dressing storage compartment 120 is constructed to be flush with a top of the cover 110 in a ready-to-use position (as shown in FIG. 1), but can be pulled upwards to a pulled-up position (as shown in FIG. 3) wherein the dressing storage compartment 120 protrudes beyond the top of the cover 110 due to the elasticity and deformability of the material.

The dressing storage compartment 120 has a circular upper wall 121, and a side wall 122 extending downward from a circumferential outer edge of the upper wall 121, and a flange 123 extending outwardly from a lower section of the side wall 122. The side wall 122 completely surrounds the circumference of the upper wall to form a cavity for receiving the dressing or other food stuffs. The flange 123 is pivotally connected to the cover 110, for example by a hinge, to allow for pivotal movement of the shutter 140 with respect to the dressing storage compartment 120. When the dressing storage compartment 120 is in the ready-to-use position, the flange 123 is depressed and forms together with the side wall 122 a depressed portion 124. When the dressing storage compartment 120 is pulled upwards to the pulled-up position, the upper wall 121, the side wall 122 and the flange 123 would become a domed structure.

The shutter 140 is made out of a non-elastic material and used to seal the dressing. The dressing storage compartment 120 and the shutter 140 are attached with each other in a fluid-sealing manner to prevent any leakage of the dressing. In this embodiment, the shutter 140 has two tabs 141 in a spaced-apart fashion. The tabs 141 are positioned to be releasably attached to an inner surface of the lower section of the side wall 122.

FIG. 2 illustrates one exemplary method for releasably snap-fitting the tabs 141 into the lower section of the side wall 122. As illustrated, each of the tabs 141 has a lateral coupling 142 which is releasably received in a shallow groove 125 formed in the lower section of the side wall 122. When the side wall 122 is grasped to be pulled upwards, the whole dressing storage compartment 120 will protrude beyond the cover 110, providing the ease of squeezing the dressing storage compartment 120 by a hand. As the dressing storage compartment 120 is pulled upwards and further subject to be squeezed, the coupling 142 would disengage from the groove 125 of the side wall 122, in this case the shutter 140 would pivot away from the dressing storage compartment 120 to expose the dressing held therein. The dressing then drops through the open bottom 126 onto the salad contained in the container portion 200. This arrangement would make it possible that the dressing is automatically dispensed without the need of a user's intervention in opening the dressing packet or sachet.

A skilled person in the art would appreciate that alternative methods of releasably attaching the shutter 140 onto the side wall 122 are available.

To fill the container 10 with food stuffs such as the salad dressing, the dressing storage compartment 120 is first uncovered by removing the shutter 140 and filled with the dressing. The shutter 140 is then snap-fitted into the lower section of the side wall 122 to seal the dressing.

To dispense the dressing onto the salad contained in the container portion 200, an upward pull force is applied to the upper wall 121 and/or the side wall 122, for example by a user's fingers, with respect to the cover 110 as shown in FIG. 3. As the dressing storage compartment 120 is manufactured from the elastic and deformable material such as silicon, the elasticity and deformability of the material allows the upper wall 121, the side wall 122 and the flange 123 to move upwards, and the upward movement of the side wall 122 forces the shutter 140 to detach from the side wall 122 and to pivot downwardly, and ultimately causes to open the dressing storage compartment 120, allowing the dressing to drop onto the salad below. Squeezing the dressing storage compartment 120 would make it easier for the shutter to detach from the side wall 122 and for the dressing to dispense downwardly.

Figure 4:
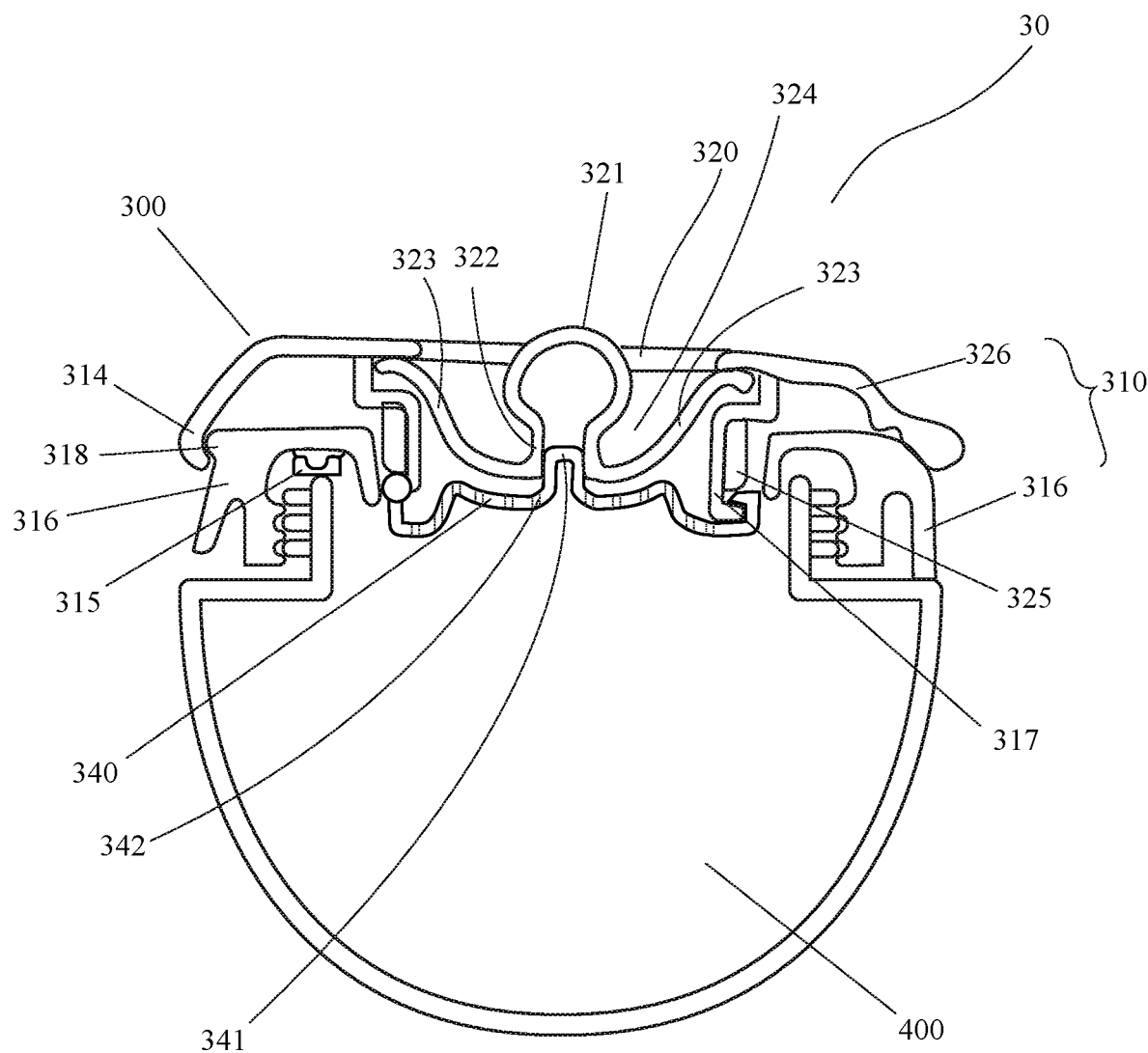
FIG. 4 is a cross-sectional view of a food container constructed according to a second embodiment of the present invention, with the dressing storage compartment in the ready-to-use position.
Figure 5:
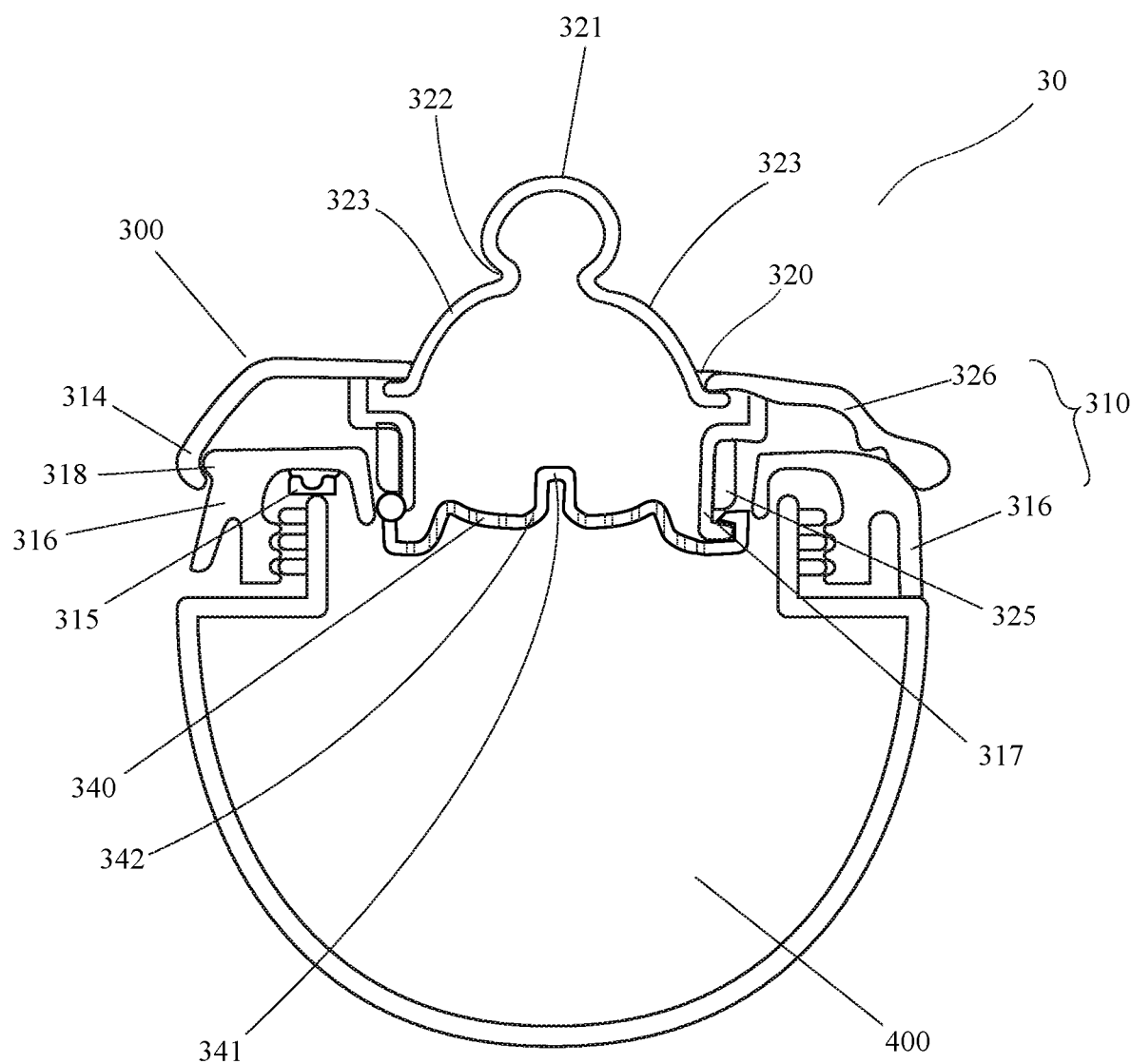
FIG. 5 is a cross-sectional view of the food container shown in FIG. 4, with the dressing storage compartment in the pulled-up position.

FIGS. 4 and 5 illustrate a container constructed according to a second embodiment of the invention. The container 30 is structurally similar to the container 10 as illustrated in FIGS. 1-3 but have some structural variations.

In particular, the lid 300 comprises a cover 310 having a top cover portion 326 and a lower cover portion 316 pivotally coupled to the top cover portion 326. The lower cover portion 316 is threaded to a side wall of the top of the container portion 400. A first sealing ring 315 is arranged between the lower cover portion 316 and the top of the container portion 400 to create a sealing action therebetween. Each of the top and lower cover portions 326 and 316 is configured to have a central respective window. The top cover portion 326 includes a top latch 314 that releasably engages with a corresponding lower latch 318 formed on the lower cover portion 316. In operation, the top latch 314 engages with the lower latch 318 to maintain the container in a closed position. When the top latch 314 is biased away to disengage from the lower latch 318, the top cover portion 326 is opened to expose the open top of the container portion 400 for a user to consume the contents contained therein.

The dressing storage compartment 320 runs through the respective central windows of the top and lower cover portions 326 and 316, and is also constructed to be flush with a top of the top cover portion 326 in the ready-to-use position. The dressing storage compartment 320 is elastic and deformable and can be pulled upwards into a pulled-up position where it protrudes beyond the top of the top cover portion 326 for releasing and dispensing the dressing. In this embodiment, the dressing storage compartment 320 has a domed upper wall 321 to form a cavity for receiving a first foodstuff, such as a dressing, a side wall 322 extending downward from a lower edge of the domed upper wall 321, and a flange 323 extending outwardly from a lower section of the side wall 322. The side wall 322 completely surrounds the circumference of the upper wall 321 to form a channel. The flange 323 may be pivotally or fixedly connected to the top cover portion 326.

A neck 317 extends downwards from the top cover portion 326 and is received in the central window of the lower cover portion 316. A second sealing ring 325 is arranged between the neck 317 and the lower cover portion 316 to create a sealing action therebetween.

The shutter 340 is used to seal the dressing. In this embodiment, the shutter 340 is secured onto the top cover portion 326 or the lower cover portion 316 by, for example, screws. The shutter 340 has a plurality of through holes 342 extending therethrough, and further has a central protrusion 341 which is sized and shaped to be releasably received in the channel formed by the side wall 322 in a fluid-sealing manner, thereby sealingly closing the open bottom of the dressing storage compartment 320 in its ready-to-use position. The central protrusion 341 has a snap-fit feature that allows to release the protrusion 341 from the channel when the domed upper wall 321 is grasped and moved upwards to the pulled up position. For instance, the central protrusion 341 may be configured to have the snap-fitting features as shown in FIG. 2. The shutter 340 remains stationary because it is secured to the top or lower cover portion 326, 316, when the dressing storage compartment 320 moves up relative to the top and lower cover portions 326 and 316. Then a gap is created between the shutter 340 and the dressing storage compartment 320. The gap and the open bottom of the dressing storage compartment 320 allow the dressing to drop out of the dressing storage compartment 320 and drop down through the plurality of through holes 342 formed on the shutter 340 onto a second foodstuff, such as salad, contained in the container portion 400.

When the dressing storage compartment 320 is in the ready-to-use position, the flange 323 is depressed and forms together with the side wall 322 and the domed upper wall 321 a depressed portion 324. This depressed portion 324 provides the convenience of grasping and moving upwards the domed upper wall 322. In use, when the dressing storage compartment 320 is pulled upwards to the pulled-up position, the domed upper wall 321, the side wall 322 and the flange 323 would become a domed structure.

After the salad dressing is dispensed, the user may tilt and/or shake the container so that the salad and the dressing are mixed evenly to be consumed by the user. FIGS. 6(A)-6(F) schematically illustrate the whole process of operating the container of the invention, including dispensing the dressing, shaking the container to evenly mix the salad and the dressing, and opening the lid to consume the well-prepared salad.

Figures 6A, 6B, 6C:
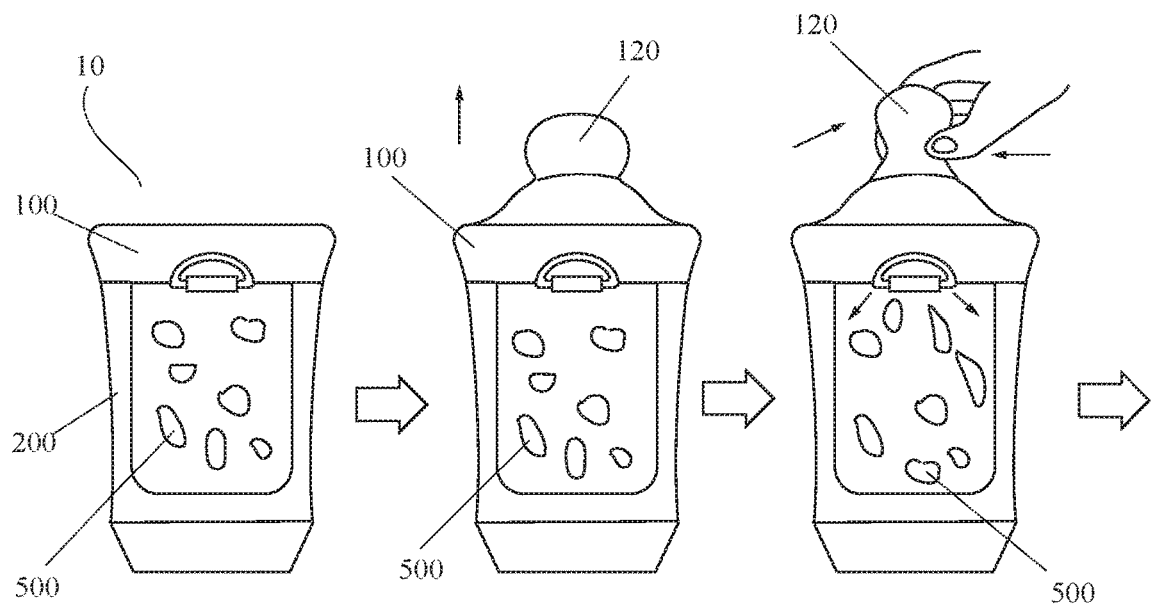
FIG. 6(A)-6(F) is a flow diagram of mixing the dressing contained in the lid and the salad contained in the container according to an embodiment of the present invention.

As illustrated in FIG. 6(A), the salad 500 is contained in the container portion 200 of the container 10, and the dressing is sealingly held in the dressing storage compartment 120 in its ready-to-use position, wherein the top of the dressing storage compartment 120 is flush with the top of the cover 110.

In FIG. 6(B), the dressing storage compartment 120 is grasped and pulled upwardly to its pulled-up position, wherein the shutter 140 is disengaged from the open bottom of the dressing storage compartment 120 to allow the dressing to drop out therefrom.

In FIG. 6(C), the dressing storage compartment 120 may be squeezed to facilitate to further push the dressing out of the dressing storage compartment 120 and onto the salad 500 contained in the container portion 200.

Figures 6D, 6E, 6F:
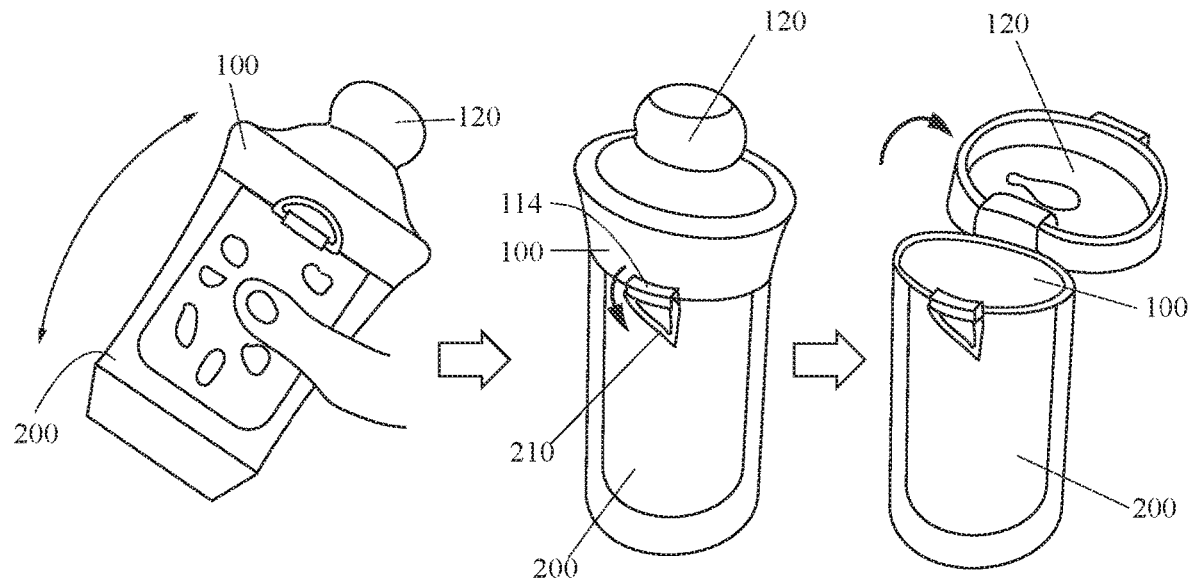

After that, the container may be tilted and/or shook to mix the salad and the dressing evenly (FIG. 6(D)). Then lid latch 114 is biased away to disengage from the container latch 210 (FIG. 6(E)), allowing the lid 100 to be opened for the user to consume the mixture of the salad and the dressing (FIG. 6(F)).

In an alternative embodiment of the invention, the dressing storage compartment may be made of a non-elastic material. In this case, the dressing storage compartment is configured to slide upwards and downwards by a mechanical sliding device, which is similar in structure to a coffee cup having a slidable inner cup.

In summary, the container of the invention, which comprises a lid as discussed above, is characterized by providing a dressing storage compartment disposed in the lid, and automatically opening the dressing storage compartment to dispense the dressing contained therein without any intervention of a user. Another characterizing feature of the invention is the arrangement of the dressing storage compartment, which lies in flush with the top of the lid in non-use and can be pulled upwards in use. The upward movement forces the shutter to disengage from the dressing storage compartment.

Thus, the present invention provides an easy and convenient way to transport favorite dressing and salad on-the-go. The container of the invention is easy to squeeze the dressing storage compartment with a leak proof shutter.

While the embodiments described herein are intended as exemplary container lids and containers, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

REFERENCE NUMERALS 10 container
30 container
100 lid
110 cover
112 window
114 lid latch
120 dressing storage compartment
121 upper wall
122 side wall
123 flange
124 depressed portion
125 groove
126 open bottom of dressing storage compartment
140 shutter
141 tab
142 lateral coupling
200 container portion
210 container latch
212 holder
214 fork
300 lid
310 cover
314 top latch
315 first sealing ring
316 lower cover portion
317 neck
318 lower latch
320 dressing storage compartment
321 upper wall
322 side wall
323 flange
324 depressed portion
325 second sealing ring
326 top cover portion
340 shutter
341 central protrusion
400 container portion
500 salad

What is claimed is:

1. A lid (100, 300) for a food container (10), comprising:
a cover (110, 316, 326) having a window (112) formed therethrough,
a dressing storage compartment (120, 320) received in the window (112) of the cover (110, 316, 326) for holding a first foodstuff and having an open bottom (126), the dressing storage compartment being elastically deformable to move between a ready-to-use position and a pulled-up position, and
a shutter (140, 340) attached to the cover (110, 316, 326) or the dressing storage compartment (120, 320) for sealingly closing the open bottom (126) of the dressing storage compartment (120, 320),
wherein the shutter (140, 340) is configured to allow dispensing of the first foodstuff contained in the dressing storage compartment (120, 320) through the open bottom (126) when the dressing storage compartment (120, 320) is grasped to elastically deform to move up to the pulled-up position relative to the cover (110, 316, 326), and wherein the dressing storage compartment (120) comprises an upper wall (121), a side wall (122) extending downwardly from an edge of the upper wall (121), and a flange (123) extending outwardly from a lower section of the side wall (122) and connected to the cover (110), wherein the flange (123) is depressed and forms together with the side wall (122) a depressed portion (124) in the ready-to-use position.

2. The lid according to claim 1, wherein when in the ready-to-use position, the shutter (140, 340) engages with the dressing storage compartment (120, 320) in a manner that the open bottom (126) of the dressing storage compartment (120, 320) is sealingly closed by the shutter (140, 340), and when in the pulled-up position, the shutter (140, 340) disengages from the open bottom (126) of the dressing storage compartment (120, 320) to allow the dispensing of the first foodstuff.

3. The lid according to claim 2, wherein the dressing storage compartment (120, 320) is flush with the cover (110, 316, 326) in the ready-to-use position, and the dressing storage compartment (120, 320) is forced to move up to the pulled-up position where at least part of the dressing storage compartment (120, 320) protrudes beyond the cover (110, 316, 326) so as to disengage the shutter (140, 340) from the open bottom (126) of the dressing storage compartment (120, 320).

4. The lid according to claim 1, wherein the shutter (140) is pivotally attached to the cover (110) or the dressing storage compartment (120), and is caused to automatically disengage from the open bottom (126) of the dressing storage compartment (120) after the dressing storage compartment (120) is moved up and/or subject to a squeeze action.

5. The lid according to claim 4, wherein the shutter (140) comprises two tabs (141) in a spaced-apart fashion, and the two tabs are positioned to be releasably attached to an inner surface of the lower section of the side wall (122).

6. The lid according to claim 5, wherein each of the tabs (141) comprises a lateral coupling (142) which is releasably snap-fitted into a groove (125) formed in the lower section of the side wall (122).

7. The lid according to claim 1, wherein the cover (110) is pivotally coupled to a side wall of a top of a container portion (200) of the food container (10).

8. The lid according to claim 7, wherein the cover (110) comprises a lid latch (114) which releasably engages with a corresponding container latch (210) formed on the side wall of the top of the container portion (200).

9. A food container (10, 30) comprising:
a lid (100, 300) according to claim 1, and
a container portion (200, 400) having an open top over which the lid (100, 300) is placed, and configured to hold a second foodstuff.

10. The food container (10, 30) according to claim 9, wherein a holder (212) is provided on an outer wall of the container portion (200, 400) for holding food serving utensils.

11. The food container (10, 30) according to claim 9, wherein the first foodstuff is a dressing, and the second foodstuff is salad.

12. A lid (100, 300) for a food container (10), comprising:
a cover (110, 316, 326) having a window (112) formed therethrough,
a dressing storage compartment (120, 320) received in the window (112) of the cover (110, 316, 326) for holding a first foodstuff and having an open bottom (126), the dressing storage compartment being elastically deformable to move between a ready-to-use position and a pulled-up position, and
a shutter (140, 340) attached to the cover (110, 316, 326) or the dressing storage compartment (120, 320) for sealingly closing the open bottom (126) of the dressing storage compartment (120, 320),
wherein the shutter (140, 340) is configured to allow dispensing of the first foodstuff contained in the dressing storage compartment (120, 320) through the open bottom (126) when the dressing storage compartment (120, 320) is grasped to elastically deform to move up to the pulled-up position relative to the cover (110, 316, 326)
wherein the shutter (340) is secured to the cover (310) and formed with a plurality of through holes extending therethough, and the shutter (340) further comprises a central protrusion (341) which is sized and shaped to releasably and sealingly engage with the open bottom of the dressing storage compartment (320), and
wherein the cover (310) comprises a lower cover portion (316) threaded to a side wall of a top of a container portion (400), and a top cover portion (326) pivotally coupled to the lower cover portion (316), wherein the lower cover portion (316) and the top cover portion (326) are configured to have respective coaxial windows for passage of the dressing storage compartment therethrough.

13. The lid according to claim 12, wherein the upward movement of the dressing storage compartment (120) drives disengagement of the central protrusion (341) from the open bottom of the dressing storage compartment (320), with a gap created between the shutter (340) and the dressing storage compartment (320) to allow the dispensing of the first foodstuff through the open bottom, the gap (340) and the plurality of through holes.

14. The lid according to claim 12, wherein the top cover portion (326) comprises a top latch (314) which releasably engages with a corresponding lower latch (318) formed on the lower cover portion (316).

15. The lid according to claim 12, wherein a first sealing ring (315) is arranged between the lower cover portion (316) and the top of the container portion (400) so that they are sealingly coupled with each other.

16. The lid according to claim 12, wherein a neck (317) extends downwardly from the top cover portion (326) and threaded into the lower cover portion (316).

17. The lid according to claim 16, wherein a second sealing ring (325) is arranged between the neck (317) and the lower cover portion (316) so that they are sealingly coupled with each other.

18. A food container (10, 30) comprising:
a lid (100, 300) according to claim 12, and
a container portion (200, 400) having an open top over which the lid (100, 300) is placed, and configured to hold a second foodstuff.

19. The food container (10, 30) according to claim 18, wherein a holder (212) is provided on an outer wall of the container portion (200, 400) for holding food serving utensils.

20. The food container (10, 30) according to claim 18, wherein the first foodstuff is a dressing, and the second foodstuff is salad.

* * * * *